(12) United States Patent
Liao

(10) Patent No.: US 11,027,763 B2
(45) Date of Patent: Jun. 8, 2021

(54) CART OF TELESCOPIC STRUCTURE

(71) Applicants: UNIQUE PRODUCT & DESIGN CO., LTD., Tainan (CN);
DONGGUAN WENJIAN GOLF PRODUCTS CO., LTD., Guangdong (CN)

(72) Inventor: Tsoung-Yong Liao, Tainan (CN)

(73) Assignee: Unique Product & Design Co., Ltd., Tainan (TW)

( * ) Notice: Subject to any disclaimer, the term of this patent is extended or adjusted under 35 U.S.C. 154(b) by 0 days.

(21) Appl. No.: 16/646,078

(22) PCT Filed: Sep. 11, 2017

(86) PCT No.: PCT/CN2017/101220
§ 371 (c)(1),
(2) Date: Mar. 10, 2020

(87) PCT Pub. No.: WO2019/047212
PCT Pub. Date: Mar. 14, 2019

(65) Prior Publication Data
US 2020/0283051 A1    Sep. 10, 2020

(51) Int. Cl.
*B62B 7/06* (2006.01)
*B62B 7/08* (2006.01)

(52) U.S. Cl.
CPC .............. *B62B 7/068* (2013.01); *B62B 7/062* (2013.01); *B62B 7/08* (2013.01)

(58) Field of Classification Search
CPC ............ B62B 7/06; B62B 7/062; B62B 7/068
See application file for complete search history.

(56) References Cited

U.S. PATENT DOCUMENTS

| | | | |
|---|---|---|---|
| 2007/0085302 A1* | 4/2007 | You | B62B 7/06 280/642 |
| 2015/0321689 A1* | 11/2015 | Liu | B62B 7/064 280/650 |
| 2015/0329135 A1 | 11/2015 | Sun | |

(Continued)

FOREIGN PATENT DOCUMENTS

| | | |
|---|---|---|
| CN | 2776788 Y | 5/2006 |
| CN | 201052784 Y | 4/2008 |

(Continued)

*Primary Examiner* — Erez Gurari
(74) *Attorney, Agent, or Firm* — Muncy, Geissler, Olds & Lowe, P.C.

(57) ABSTRACT

Disclosed is a cart of a telescopic structure, comprising: a telescopic rod; a telescopic tube, where at least one of the telescopic tube and the telescopic rod have a hollow structure acting as an accommodation space that is required when the telescopic tube and the telescopic rod collapse into each other; a linkage mechanism connected to one end of the telescopic tube that is away from the hollow structure, and connected to one end of the telescopic rod that is close to the hollow structure; and a frame connected to the linkage mechanism. When the frame is rotated with respect to the linkage mechanism and collapses, the telescopic tube is also rotated with respect to the linkage mechanism, and one of the telescopic tube and the telescopic rod is retracted into the other thereof by means of the linkage mechanism.

12 Claims, 13 Drawing Sheets

(56) References Cited

U.S. PATENT DOCUMENTS

| | | | |
|---|---|---|---|
| 2015/0360709 A1* | 12/2015 | Pos ........................... | B62B 7/06 |
| | | | 280/47.38 |
| 2017/0021851 A1* | 1/2017 | Pujol ......................... | B62B 9/20 |
| 2017/0072982 A1* | 3/2017 | Thorne ..................... | B62B 7/06 |
| 2017/0240197 A1* | 8/2017 | Oakes ...................... | B62B 7/142 |
| 2019/0135323 A1* | 5/2019 | Avigdor .................... | B62B 9/20 |
| 2020/0283051 A1* | 9/2020 | Liao ......................... | B62B 7/068 |

FOREIGN PATENT DOCUMENTS

| | | |
|---|---|---|
| CN | 102205848 A | 10/2011 |
| CN | 206107300 U | 4/2017 |
| DE | 20 2007 000 795 U1 | 7/2007 |
| JP | 2001-114111 A | 4/2001 |
| TW | 200605823 A | 2/2006 |
| TW | 421144 U | 1/2012 |
| TW | 440719 U | 11/2012 |
| TW | M519105 U | 3/2016 |

\* cited by examiner

CART OF TELESCOPIC STRUCTURE

BACKGROUND

Technology Field

The present disclosure relates to a cart and, in particular, to a cart with a telescopic structure.

Description of Related Art

In the conventional art, there have been a variety of manually operated carts. For example, a stroller frame can be integrally operated to achieve an extended state and a folded state. The stroller frame includes a handle tube, a front leg tube, a rear leg tube, a lateral frame tube, and a central chassis tube. The front leg tube, the rear leg tube, the lateral frame tube, and the central chassis tube can be connected to each other. In addition, the stroller frame further includes a manual operation mechanism, which is characterized in that the manual operation mechanism includes a gear and the rack transmission mechanism. The user can operate the manual operation mechanism to drive the gear and the rack transmission mechanism to achieve the extending or folding of the stroller frame.

Although the known structure can also utilize a gear set to achieve the extending or folding of the frame, the known structure can only extend or fold the stroller frame in stepwise through the manual operation mechanism, so the operation requires a lot of time and effort, which is not convenient for the user. Therefore, it is an important subject to be solved to develop a cart with an automatic telescopic structure.

SUMMARY

In view of the foregoing subject, an objective of this disclosure is to provide a cart with a telescopic structure, which utilizes a unique linkage mechanism to achieve the automatic telescopic extending or folding of the cart, thereby making the cart more convenient.

To achieve the above objective, the present disclosure provides a cart with a telescopic structure, which comprises: a telescopic rod; a telescopic tube, wherein at least one of the telescopic rod and the telescopic tube has a hollow structure configured to provide an accommodation space for collapsing the telescopic rod and the telescopic tube; a linkage mechanism connected to one end of the telescopic tube away from the hollow structure, and connected to one end of the telescopic rod close to the hollow structure; and a frame connected to the linkage mechanism. When the frame is rotated with respect to the linkage mechanism and folded, the telescopic tube is also rotated with respect to the linkage mechanism, and one of the telescopic tube and the telescopic rod is retracted into the other one thereof by the linkage mechanism.

Preferably, the linkage mechanism comprises: a gear; and at least two rotation members capable of rotating with respect to each other, wherein each of the rotation members comprises a hole, the hole is configured with a rack, the racks are disposed corresponding to each other, the gear is disposed through the holes and engaged with the racks, and when the at least two rotation members are relatively rotated, the gear is driven to rotate; and one of the rotation members comprises a first extension portion connecting to the end of the telescopic tube away from the hollow structure.

Preferably, the telescopic tube comprises a sliding wheel disposed at one end of the telescopic tube close to the hollow structure and a sliding rail disposed in the hollow structure, and the linkage mechanism comprises: a first driving member connected to one side of the gear, wherein the first driving member comprises a first transmission member, which is retractable, and one end of the first transmission member is connected to the telescopic rod through the sliding wheel; and a second driving member connected to another side of the gear, wherein the second driving member comprises a second transmission member, which is retractable, and the second transmission member is connected to the telescopic rod. When the telescopic tube rotates toward a first direction with respect to the linkage mechanism to drive the at least two rotation members to relatively rotate, thereby further driving the gear to rotate the first driving member and the second driving member so as to release the first transmission member and pull the second transmission member back, so that the telescopic rod moves along the sliding rail and is retracted into the telescopic tube.

Preferably, when the telescopic tube is rotated toward a second direction with respect to the linkage mechanism to drive the at least two rotation members to relatively rotate, thereby further driving the gear to rotate the first driving member and the second driving member so as to pull the first transmission member back and release the second transmission member, so that the telescopic rod moves along the sliding rail and protrudes from the telescopic tube.

Preferably, the other one of the rotation members comprises a second extension portion, and the first extension portion and the second extension portion extend toward different directions.

Preferably, the frame comprises a front frame connecting to a front wheel and a rear frame connecting to a rear wheel. The front frame connects to the second extension portion, and the rear frame connects to the linkage mechanism, so that the front frame and the telescopic tube can be extended or folded with respect to the rear frame through the linkage mechanism.

Preferably, the linkage mechanism further comprises a fixing member. When an angle between the front frame and the telescopic tube increases, the telescopic rod moves and protrudes from the telescopic tube based on an action of the linkage mechanism, and the fixing member fixes the action of the linkage mechanism. When the angle between the front frame and the telescopic tube decreases, the telescopic rod moves and retracts into the telescopic tube based on the action of the linkage mechanism, and the fixing member fixes the action of the linkage mechanism.

Preferably, the linkage mechanism is a linking rod assembly.

Preferably, the telescopic tube comprises a first telescopic tube, a second telescopic tube and a third telescopic tube, and the telescopic rod comprises a first telescopic rod, a second telescopic rod and a third telescopic rod. The linking rod assembly further comprises: a mechanical main body connecting to one ends of the first telescopic tube, the second telescopic tube and the third telescopic tube away from the hollow structure; an auxiliary linking rod connecting to the mechanical main body; a first linking rod connecting to one ends of the auxiliary linking rod and the first telescopic rod close to the hollow structure; a multi joint linking rod connecting to the first linking rod; a second linking rod connecting to one ends of the multi-joint linking rod and the second telescopic rod close to the hollow structure; and a third linking rod connecting to one ends of the multi-joint linking rod and the third telescopic rod close to the hollow structure. When the first telescopic tube rotates toward a first direction with respect to the mechanical main body, the first linking rod is driven through the auxiliary linking rod so as to rotate the multi-joint linking rod and further to move the second linking rod and the third linking rod for retracting the first telescopic rod, the second telescopic rod and the third telescopic rod and to decrease an angle between the first telescopic tube and the second telescopic tube.

Preferably, when the first telescopic tube is rotated toward a second direction with respect to the mechanical main body, the first linking rod is driven through the auxiliary linking rod so as to rotate the multi-joint linking rod and further to move the second linking rod and the third linking rod for releasing the first telescopic rod, the second telescopic rod and the third telescopic rod and to increase the angle between the first telescopic tube and the second telescopic tube.

Preferably, the linkage mechanism further comprises an extension linking rod, one end of the extension linking rod connects to the first linking rod, the other end of the extension linking rod connects to a handle, and the handle comprises a curved portion connecting to one end of the first telescopic rod away from the hollow structure. When the first telescopic tube is rotated toward a first direction with respect to the mechanical main body, the handle is rotated toward the first telescopic rod so as to retract the first telescopic rod through the curved portion. When the first telescopic tube is rotated toward a second direction with respect to the mechanical main body, the first telescopic rod protrudes outwardly with respect to the first telescopic tube, and the handle is rotated to move away from the first telescopic rod through the curved portion.

Preferably, the second telescopic rod and the third telescopic rod connect to the front wheel and the rear wheel, respectively, and the linkage mechanism further comprises a fixing member. When an angle between the first telescopic tube and the second telescopic tube increases, the first telescopic rod, the second telescopic rod and the third telescopic rod are released based on an action of the linkage mechanism, and the fixing member fixes the action of the linkage mechanism. When the angle between the first telescopic tube and the second telescopic tube decreases, the first telescopic rod, the second telescopic rod and the third telescopic rod are retracted based on the action of the linkage mechanism, and the fixing member fixes the action of the linkage mechanism.

As mentioned above, the cart with a telescopic structure of this disclosure comprises a plurality of linkage mechanisms for achieving the effect of automatically extending or folding the frame, so that the user can easily fold or extend the cart. In other words, the user can easily operate to extend or fold the cart by a single hand.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

Figure 1:
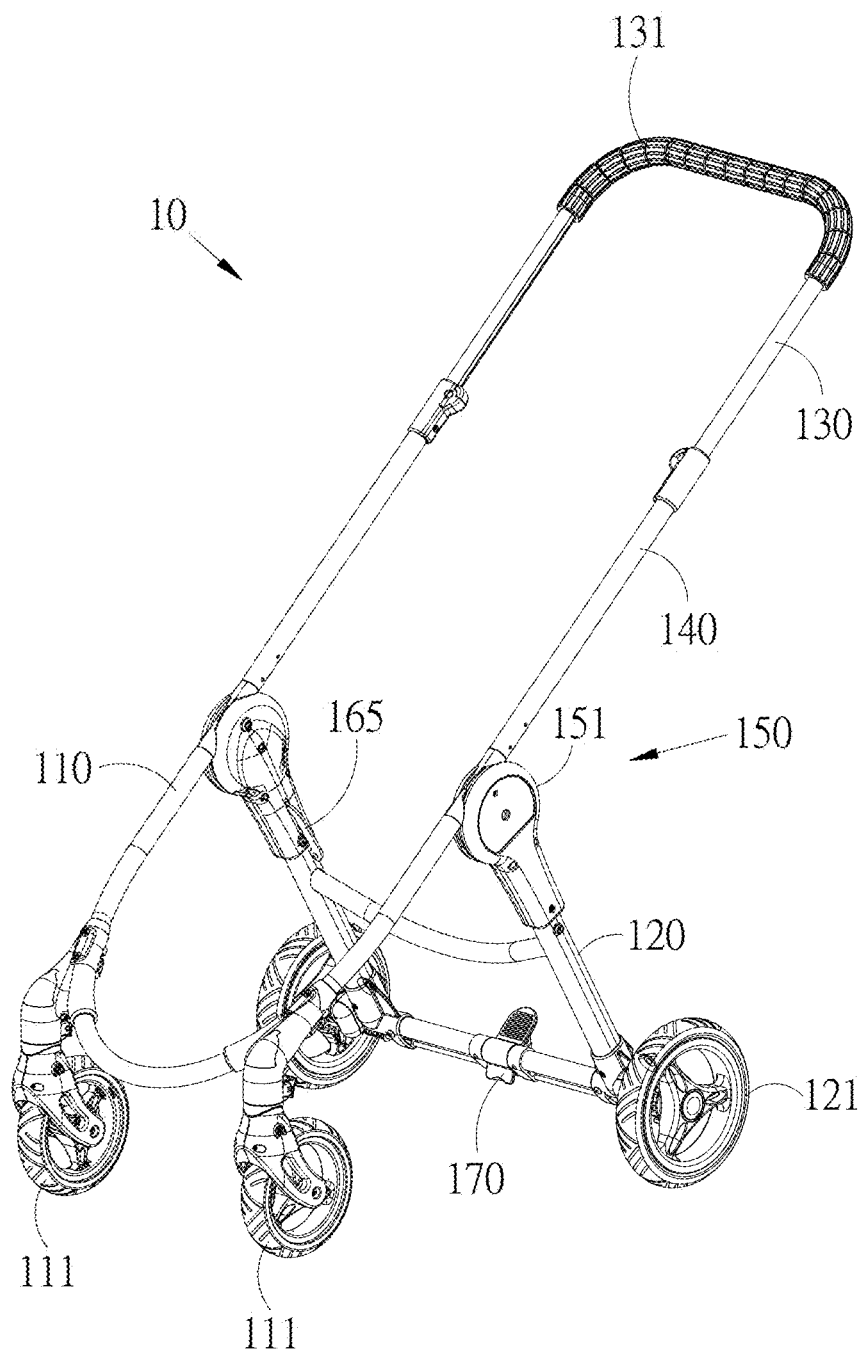
FIG. 1 is a schematic perspective diagram of a cart with a telescopic structure according to an embodiment of this disclosure, wherein the cart is in an extended state.

The present disclosure will be described with reference to the drawings in the form of embodiments for illustrating the features, contents, advantages and benefits to be achieved. The illustrations used in the drawings are merely intended to be illustrative and supplementary, and are not necessarily true proportions and precise configurations after the implementation of the present disclosure. Therefore, the proportions and configurations shown in the drawings are for illustrations only and not to limit the scope of the present disclosure.

The advantages, features, and technical methods of the present disclosure will be readily understood by referring to the following embodiments and the accompanying drawings, and the present disclosure may be implemented in various forms and should not be limited to any of the following embodiments. On the contrary, for those skilled people in the art, the provided embodiments are intended to be thorough and complete the scope of the present disclosure, and the scope of the disclosure is defined by the claims.

The embodiments of the disclosure will be described in detail below with reference to the accompanying drawings.

FIG. 1 is a schematic perspective diagram of a cart 10 with a telescopic structure according to an embodiment of this disclosure, wherein the cart 10 is in an extended state. Referring to FIG. 1, the cart 10 with a telescopic structure comprises a front frame 110, a front wheel 111, a rear frame 120, a rear wheel 121, a telescopic rod 130, a handle 131, a telescopic tube 140, a telescopic structure 150, a linkage mechanism 151, a fixing member 165, and a pedal brake device 170. In this embodiment, the components of the cart 10 are symmetrically arranged. When the components are fully extended through the operation of the telescopic structure 150, the fixing member 165 can lock the action of the linkage mechanism 151 so as to remain the cart 10 in the extended structure. In addition, the rear frame 120 further comprises a pedal brake device 170 for controlling the action of the rear wheel 121 by the latch, thereby easily controlling the movement of the cart 10.

The cart 10 of this disclosure comprises the telescopic rod 130 and the telescopic tube 140. At least one of the telescopic rod 130 and the telescopic tube 140 has a hollow structure configured to provide an accommodation space for collapsing the telescopic rod 130 and the telescopic tube 140. The linkage mechanism 150 is connected to one end of the telescopic tube 140 away from the hollow structure, and connected to one end of the telescopic rod 130 close to the hollow structure. The frame (including the front frame 110 and the rear frame 120) is connected to the linkage mechanism 151. When the frame is rotated with respect to the linkage mechanism 151 and folded, the telescopic tube 140 is also rotated with respect to the linkage mechanism 151, and one of the telescopic tube 140 and the telescopic rod 130 is retracted into the other one thereof by the linkage mechanism 151.

Figure 2:
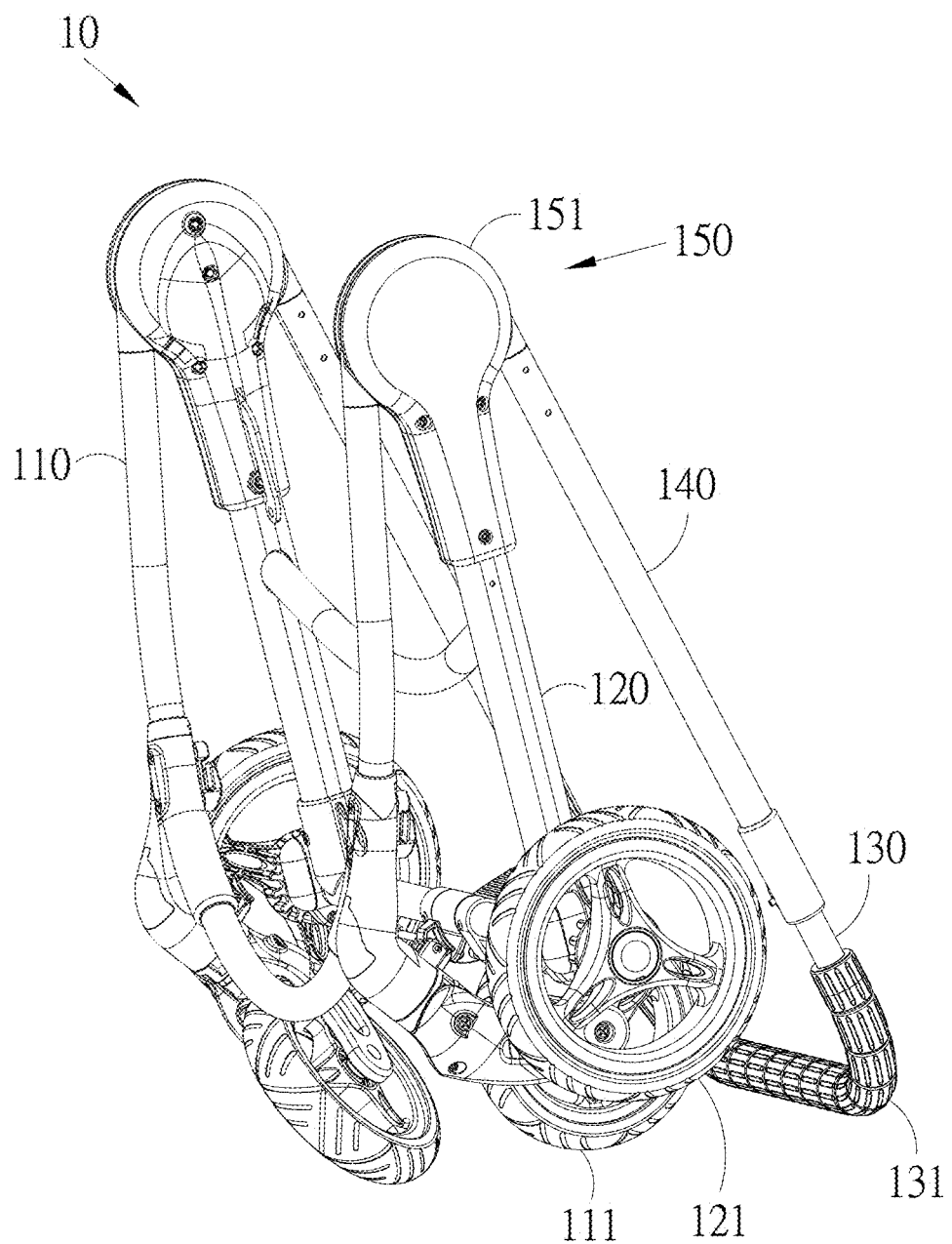
FIG. 2 is a schematic perspective diagram of a cart with a telescopic structure according to an embodiment of this disclosure, wherein the cart is in a folded state.

FIG. 2 is a schematic perspective diagram of the cart 10 with a telescopic structure according to an embodiment of this disclosure, wherein the cart 10 is in a folded state. As shown in FIG. 1, when the restricting of the linkage mechanism 151 is released through the fixing member 165, the telescopic structure 150 can drive the components to move inwardly and thus to be folded, so that the cart 10 can reach a folded state to decrease the volume of the cart 10.

Figure 3:
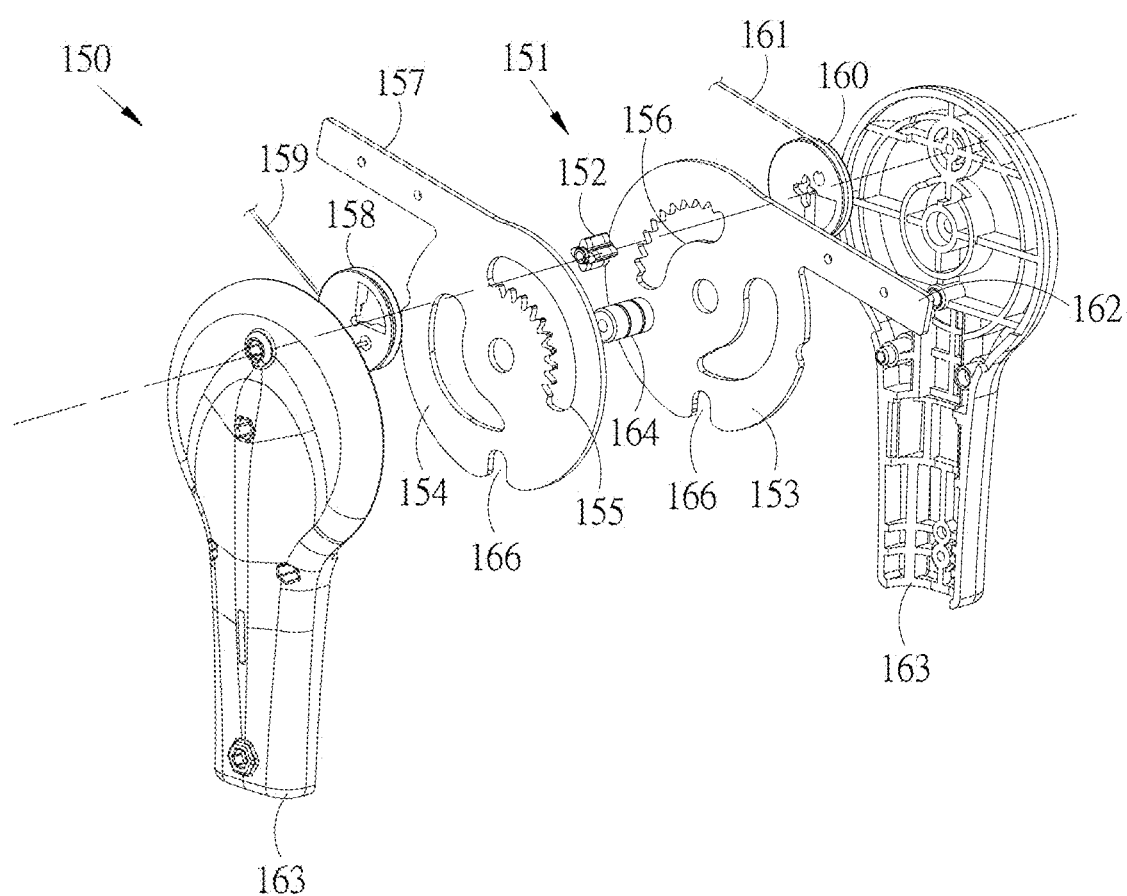
FIG. 3 is an exploded view of the linkage mechanism of the cart with a telescopic structure according to an embodiment of this disclosure.

FIG. 3 is an exploded view of the linkage mechanism 151 of the cart 10 with a telescopic structure according to an embodiment of this disclosure. In this disclosure, the linkage mechanism 151 comprises a gear 152, a rotation member 153, a rotation member 154, a driving member 158, a driving member 160, a housing 163, and a center axis 164. The rotation members 153 and 154 are connected with each other through the gear 152 and the center axis 164, and can rotate with respect to each other. The rotation members 153 and 154 can be directly connected with each other or indirectly connected with each other. Each of the rotation members 153 and 154 comprises a hole, and the holes are configured with racks 155 and 156 correspondingly. The rotation members 153 and 154 are disposed corresponding to each other. The gear 152 is disposed through the holes and engaged with the rotation members 153 and 154. When the rotation members 153 and 154 are relatively rotated, the gear 152 is driven to rotate.

In addition, the two rotation members 153 and 154 comprises extension portions 162 and 157, respectively, and the extension portions 162 and 157 extend toward different directions and connect to the telescopic tube 140 and the front frame 110, respectively. The driving members 158 and 160 connect to two sides of the gear 152, respectively, and comprise corresponding transmission members 159 and 161, respectively. The transmission members 159 and 161 are configured inside the telescopic tube 140 for connecting the telescopic rod 130. The components of the linkage mechanism 151 are symmetrically arranged, and comprise the gear 152, the center axis 164, two rotation members 153 and 154, and two driving members 158 and 160, which are arranged in order from the inside to the outside. Finally, the housing 163 is provided to cover and fix the above-mentioned components. Herein, the gear 152 and the two driving members 158 and 160 are arranged in coaxial, and the two rotation members 153 and 154 and the center axis 164 are arranged in coaxial. In this embodiment, the two driving members 158 and 160 can be winches, and the two transmission members 159 and 161 can be steel cables. Accordingly, when the linkage mechanism 151 acts, the steel cables can be stored in the winches or released from the winches.

Figure 4:
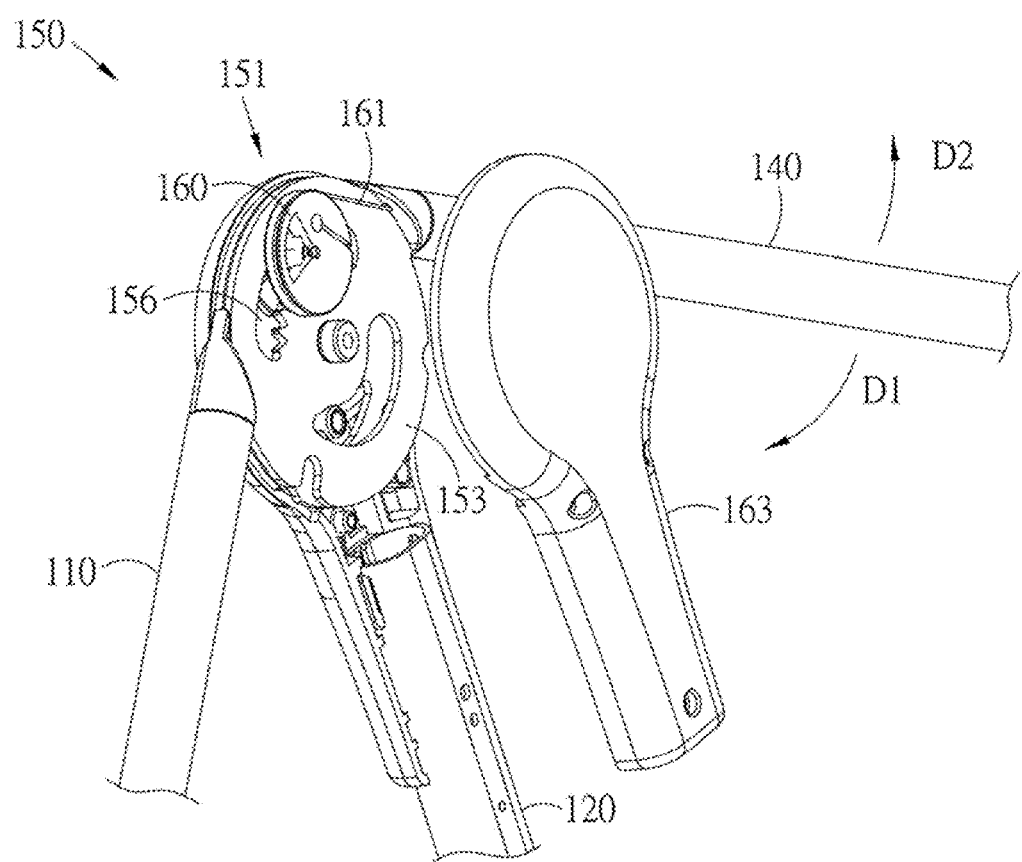
FIG. 4 is a schematic perspective diagram of the linkage mechanism of the cart with a telescopic structure according to an embodiment of this disclosure.

FIG. 4 is a schematic perspective diagram of the linkage mechanism 151 of the cart 10 with a telescopic structure according to an embodiment of this disclosure. As shown in FIG. 3, the housing 163 further connects to the rear frame 120. In this embodiment, D1 represents a first direction for rotation, and D2 represents a second direction for rotation.

Figure 5:
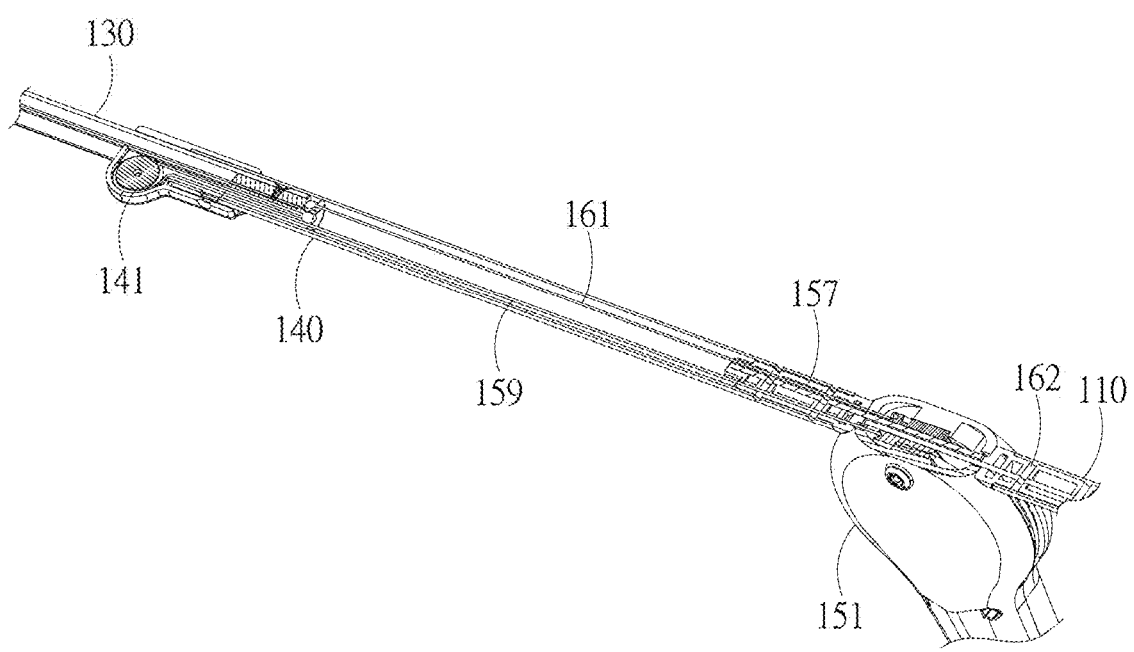
FIG. 5 is a partial sectional view of a cart with a telescopic structure according to an embodiment of this disclosure, wherein the actions of the telescopic rod, the telescopic tube and the linkage mechanism are particularly emphasized.

FIG. 5 is a partial sectional view of a cart 10 with a telescopic structure according to an embodiment of this disclosure, wherein the actions of the telescopic rod 130, the telescopic tube 140, and the linkage mechanism 151 are particularly emphasized. With reference to FIGS. 3 to 5, the telescopic tube 140 has a hollow structure for accommodating at least a part of the telescopic rod 130. The telescopic tube 140 also comprises a sliding wheel 141 disposed at one end of the telescopic tube 140 configured with the hollow structure and a sliding rail disposed in the hollow structure. The transmission member 159 is connected to the telescopic rod 130 through the sliding wheel 141, and the transmission member 161 is directly connected to the telescopic rod 130. Accordingly, when the telescopic tube 140 rotates toward the first direction D1 with respect to the linkage mechanism 151, the extension portion 157 connected to the telescopic tube 140 can drive the rotation member154 to rotate, thereby further driving the gear 152 to rotate the driving members 158 and 160. Then, the driving member 160 can pull the transmission member 161 back so as to pull the telescopic rod 130 inwardly, and the driving member 158 can simultaneously release the transmission member 159 so as to assist the telescopic rod 130 to move inwardly. Thus, the telescopic rod 130 can be retracted into the telescopic tube 140 along the sliding rail, and drive the two rotation members 153 and 154 to relatively rotate, thereby decreasing the angle between the extension portions 162 and 157 of the two rotation members 153 and 154 (i.e. decreasing the angle between the front frame 110 and the telescopic tube 140). On the contrary, when the telescopic tube 140 rotates toward the second direction D2 with respect to the linkage mechanism 151, the extension portion 157 connected to the telescopic tube 140 can drive the rotation member 154 to rotate, thereby further driving the gear 152 to rotate the driving members 158 and 160. Then, the driving member 158 can pull the transmission member 159 back so as to pull the telescopic rod 130 outwardly, and the driving member 160 can simultaneously release the transmission member 161 so as to assist the telescopic rod 130 to move outwardly. Thus, the telescopic rod 130 can be extended out of the telescopic tube 140 along the sliding rail, and drive the two rotation members 153 and 154 to relatively rotate, thereby increasing the angle between the extension portions 162 and 157 on the two rotation members 153 and 154 (i.e. increasing the angle between the front frame 110 and the telescopic tube 140). In this embodiment, the sliding rail disposed in the hollow structure can be a groove, a protrusion, or any other type for assisting the steady movement of the telescopic rod 130 with respect to the telescopic tube 140.

Figure 6:
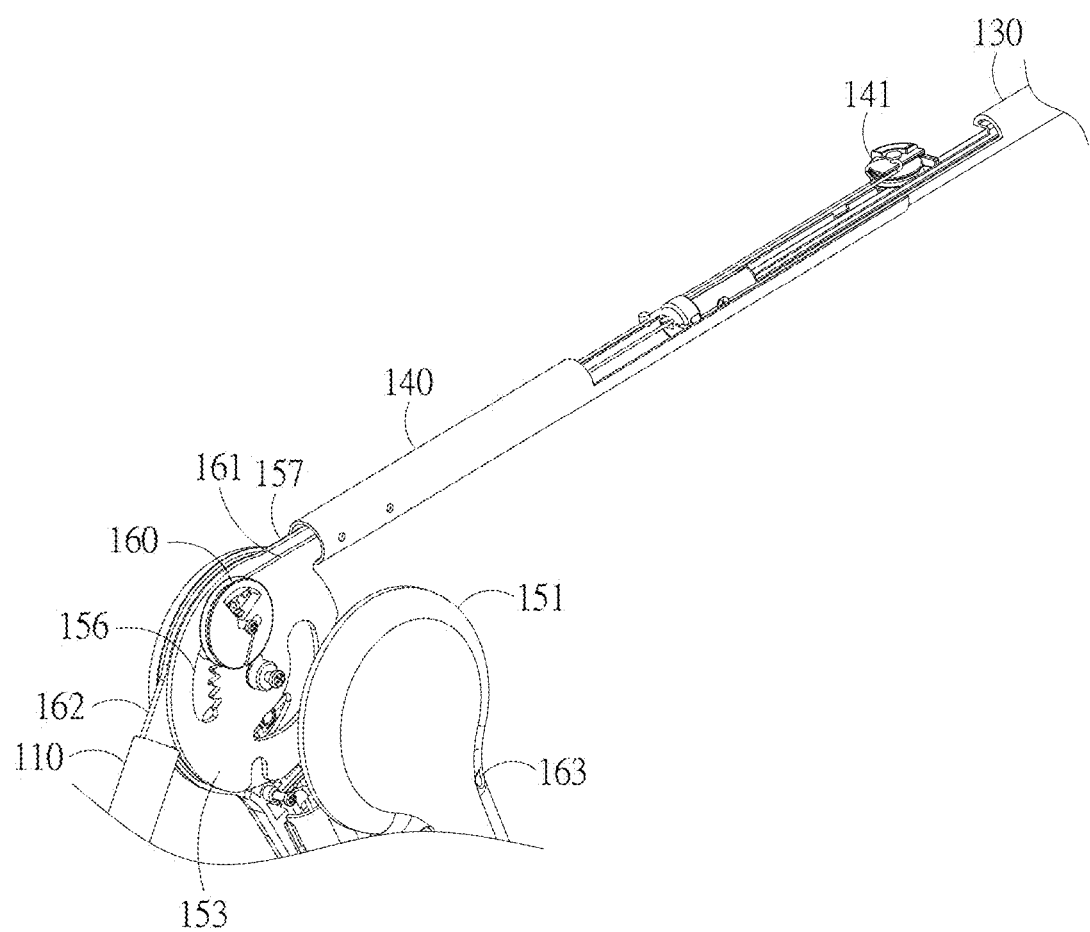
FIG. 6 is a partial sectional view of a cart with a telescopic structure according to an embodiment of this disclosure, wherein the structure of the linkage mechanism and the connections of the telescopic rod and the telescopic tube are particularly emphasized.

FIG. 6 is a partial sectional view of a cart 10 with a telescopic structure according to an embodiment of this disclosure, wherein the structure of the linkage mechanism 151 and the connections of the telescopic rod 130 and the telescopic tube 140 are particularly emphasized. FIG. 6 also clearly shows that the transmission member 159 in the linkage mechanism 151 is connected to the telescopic rod 130 through the sliding wheel 141, and the transmission member 161 is directly connected to the telescopic rod 130. By the action of the linkage mechanism 151, the telescopic tube 140 and the front frame 110 can be extended or retracted with respect to the rear frame 120, and the telescopic rod 130 can drive the connected handle 131 to extend out or retract.

Figure 7:
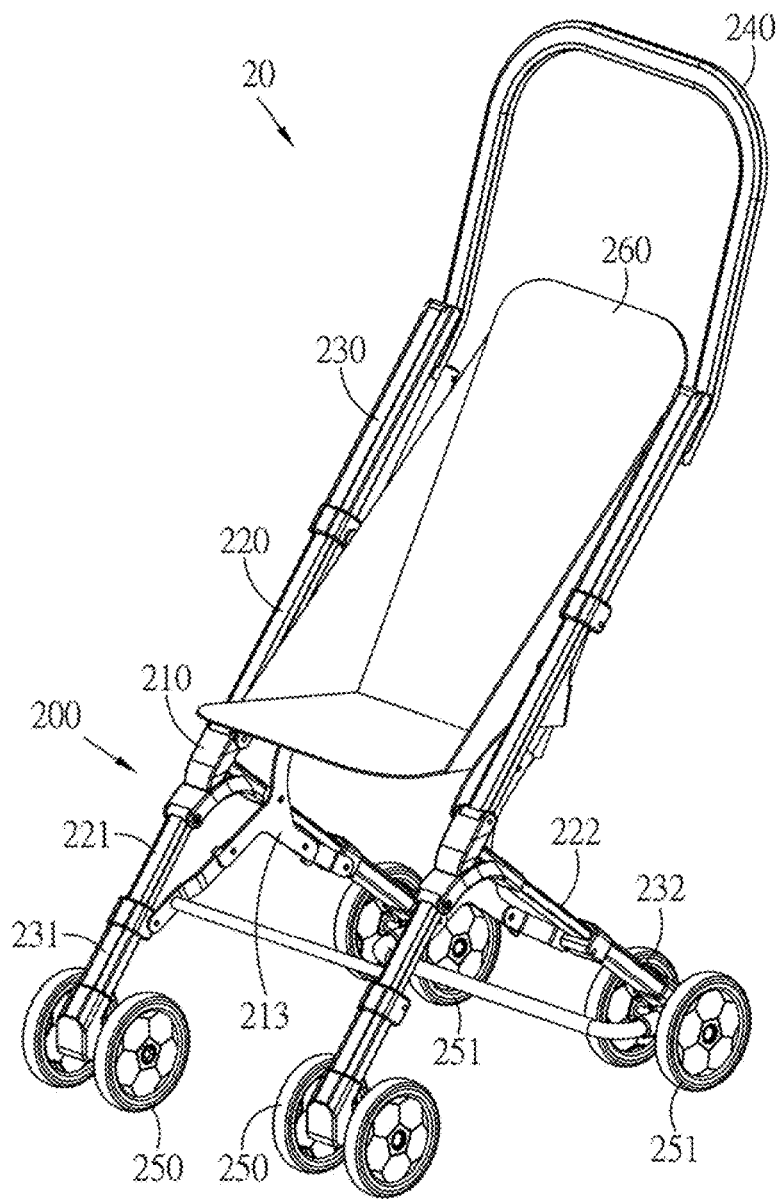
FIG. 7 is a schematic perspective diagram of a cart with a telescopic structure according to another embodiment of this disclosure, wherein the cart is in an extended state.

FIG. 7 is a schematic perspective diagram of a cart 20 with a telescopic structure according to another embodiment of this disclosure, wherein the cart 20 is in an extended state. The cart 20 with a telescopic structure of this disclosure comprises a linkage mechanism 200, a first telescopic tube 220, a second telescopic tube 221, a third telescopic tube 222, a first telescopic rod 230, a second telescopic rod 231, a third telescopic rod 232, a handle 240, a front wheel 250, a rear wheel 251, and an accommodation portion 260. In this embodiment, the components of the cart 20 are symmetrically arranged. Furthermore, a crossbar can be provided to connect the symmetrically arranged components for enhancing the stability of the cart 20.

Figure 8:
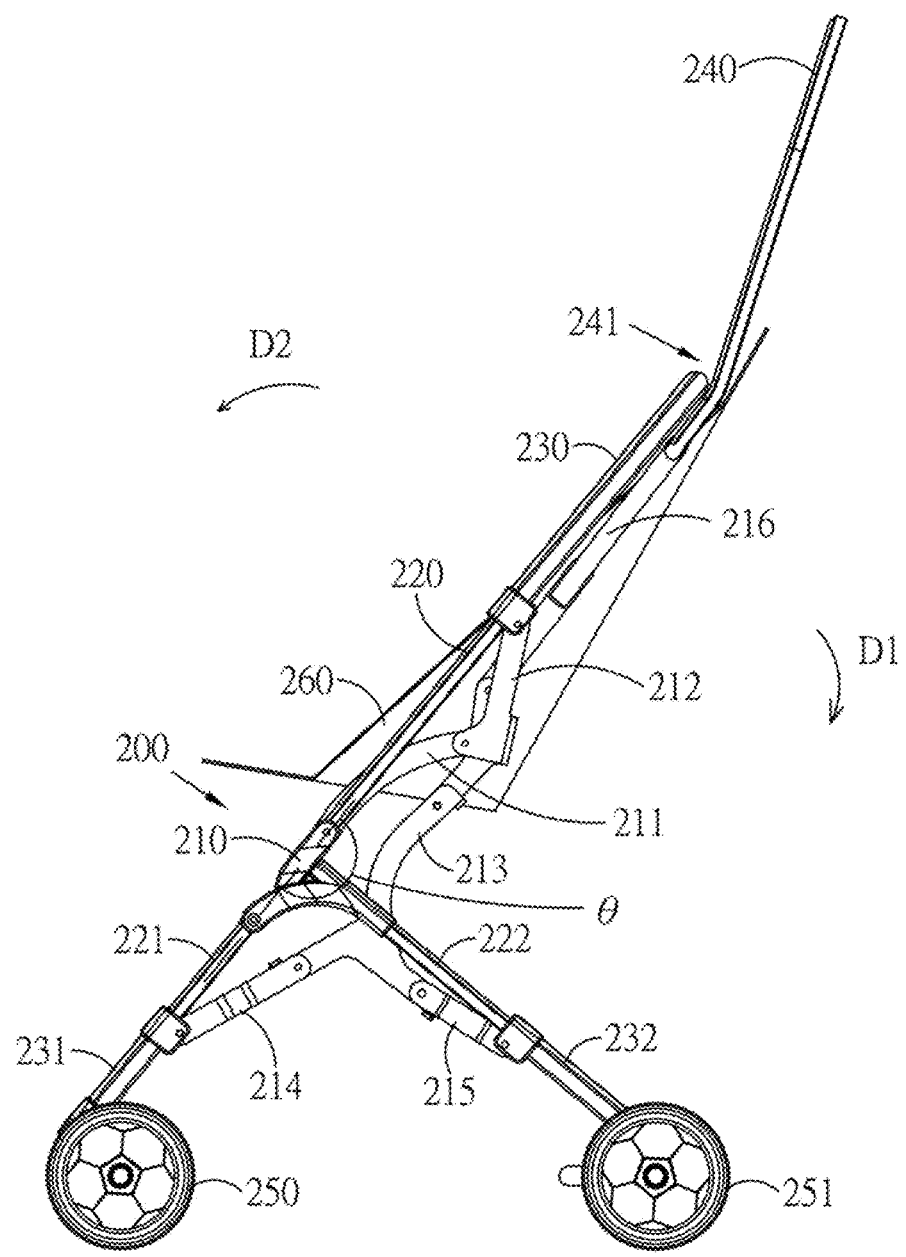
FIG. 8 is a side view of a cart with a telescopic structure according to another embodiment of this disclosure.

FIG. 8 is a side view of a cart 20 with a telescopic structure according to another embodiment of this disclosure. As shown in FIG. 7, the telescopic rods all comprise a hollow structure for accommodating the corresponding telescopic rod therein. The linkage mechanism 200 is a linking rod assembly, which comprises a mechanical main body 210 connecting to one ends of the first telescopic tube 220, the second telescopic tube 221, and the third telescopic tube 222 away from the first telescopic rod 230, the second telescopic rod 231, and the third telescopic rod 232, wherein since the mechanical main body 210 is configured as the center of the connected components, the mechanical main body 210 can be functioned as the folding center when folding the cart 20; an auxiliary linking rod 211 connecting to the mechanical main body 210 for enhancing the structural stability and guiding the action of the linkage mechanism 200; a first linking rod 212 having opposite two sides, wherein the bottom portions of the two sides are connected, one of the two sides connects to one ends of the auxiliary linking rod 211 and the first telescopic rod 230 close to the hollow structure; a multi joint linking rod 213 connecting to the other side of the first linking rod 212; a second linking rod 214 connecting to one ends of the multi-joint linking rod 213 and the second telescopic rod 231 close to the hollow structure; and a third linking rod 215 connecting to one ends of the multi joint linking rod 213 and the third telescopic rod 232 close to the hollow structure. In this embodiment, the mechanical main body 210 and the multi joint linking rod 213 are connected to the telescopic tube and the telescopic rod, respectively, and the multi joint linking rod 213 can rotate with respect to the mechanical main body 210 to drive the telescopic rod to extend or fold. The linkage mechanism 200 further comprises an extension linking rod 216. One end of the extension linking rod 216 connects to the other side of the first linking rod 212, the other end of the extension linking rod 216 connects to the handle 240, and the handle 240 comprises a curved portion 241 connecting to one end of the first telescopic rod 230 away from the hollow structure.

Figure 9:
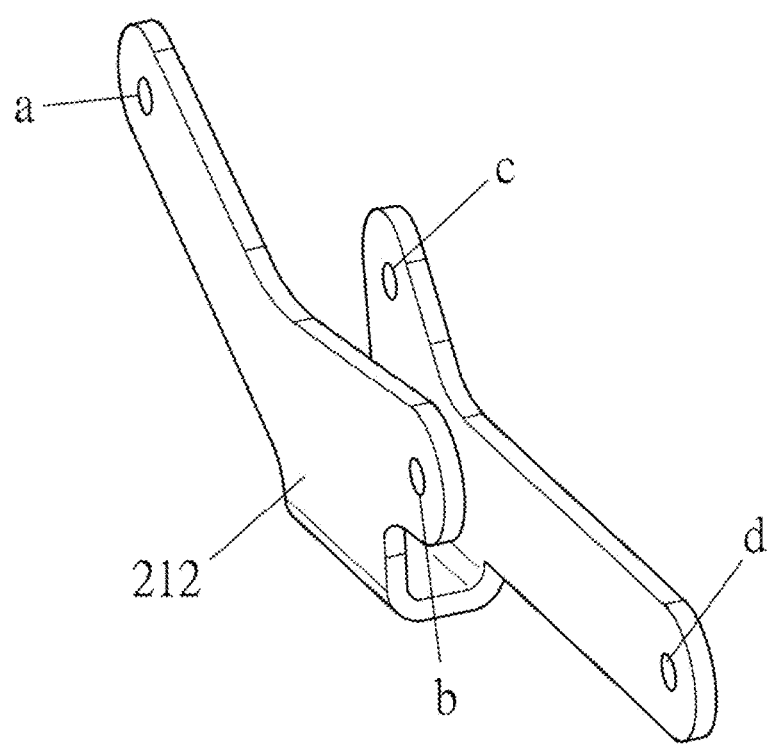
FIG. 9 is a schematic diagram of the first linking rod of the cart with a telescopic structure according to another embodiment of this disclosure.

FIG. 9 is a schematic diagram of the first linking rod 212 of the cart 20 with a telescopic structure according to another embodiment of this disclosure. The cart 20 comprises two first linking rods 212, which are disposed corresponding to each other and have reversed structures. As shown in FIG. 9, the first linking rod 212 comprised opposite two sides, and the bottom portions of the two sides are connected. Each of the two sides is configured with two joints. The first linking rod 212 connects to the multi-joint linking rod 213 through the joint a, connects to the extension linking rod 216 through the joint b, connects to the auxiliary linking rod 211 through the joint c, and connects to one end of the first telescopic rod 230 close to the hollow structure through the joint d. Accordingly, the first linking rod 212 can simultaneously connect to multiple components by the integrated structure thereof, and the configuration of the auxiliary linking rod 211 can assist to guide the action of the linkage mechanism 200 and enhance the structural stability.

In addition, the cart 20 comprises a fixing member. When the components of the cart 20 are fully extended through the operation of the linkage mechanism 200, the fixing member can lock the action of the linkage mechanism 200 so as to remain the cart 20 in the extended structure. Specifically, when the angle θ between the first telescopic tube 220 and the second telescopic tube 221 is increased, the first telescopic rod 230, the second telescopic rod 231, and the third telescopic rod 232 are released based on the action of the linkage mechanism 200, and the fixing member can lock the action of the linkage mechanism 200. When the angle θ between the first telescopic tube 220 and the second telescopic tube 221 is decreased, the first telescopic rod 230, the second telescopic rod 231, and the third telescopic rod 232 are retracted based on the action of the linkage mechanism 200, and the fixing member can lock the action of the linkage mechanism 200. Accordingly, the volume of the cart 20 can be sufficiently decreased.

Figure 10:
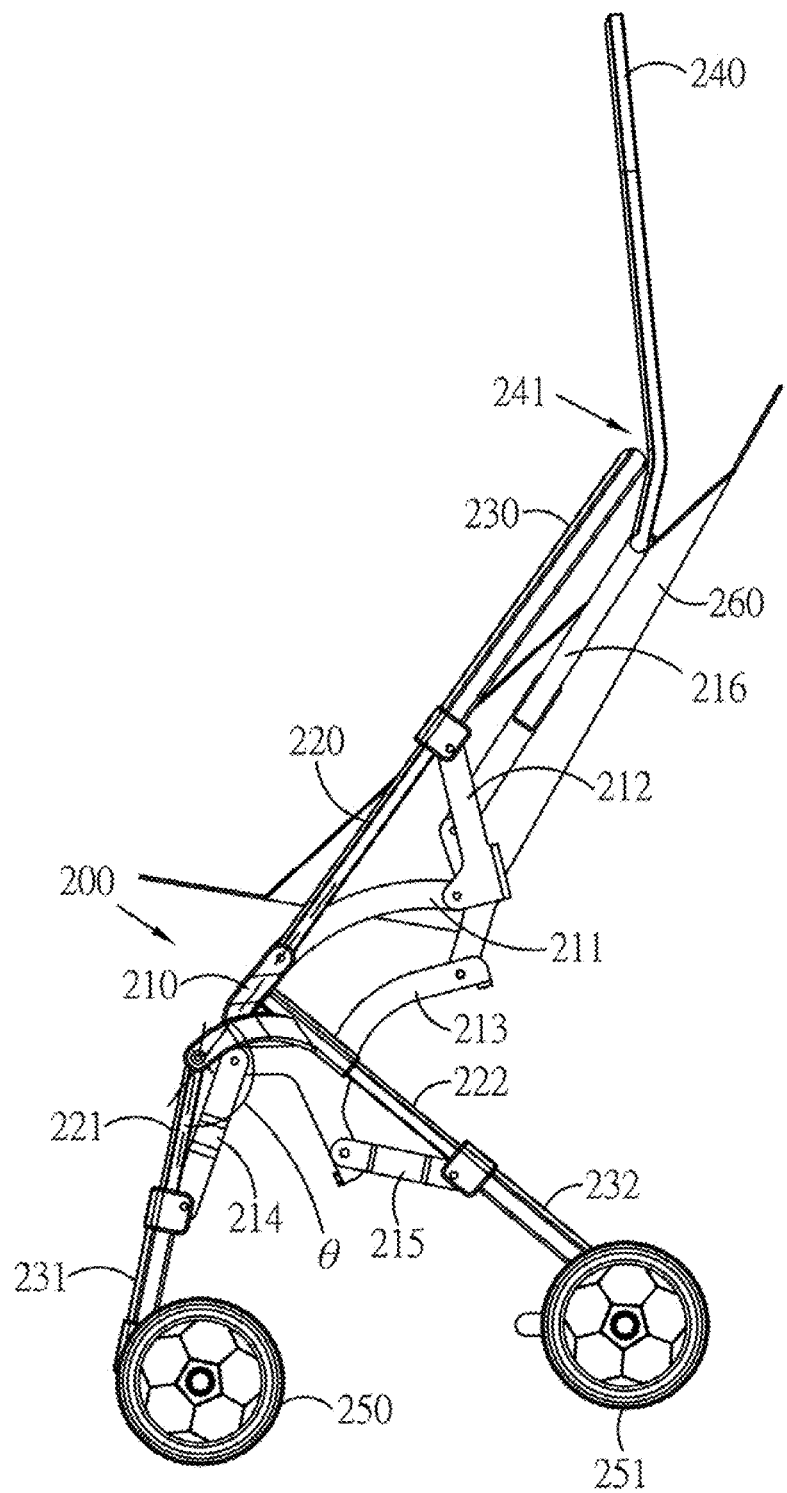
FIG. 10 is a side view of a cart with a telescopic structure according to another embodiment of this disclosure, wherein the cart is in a starting folded state.
Figure 11:
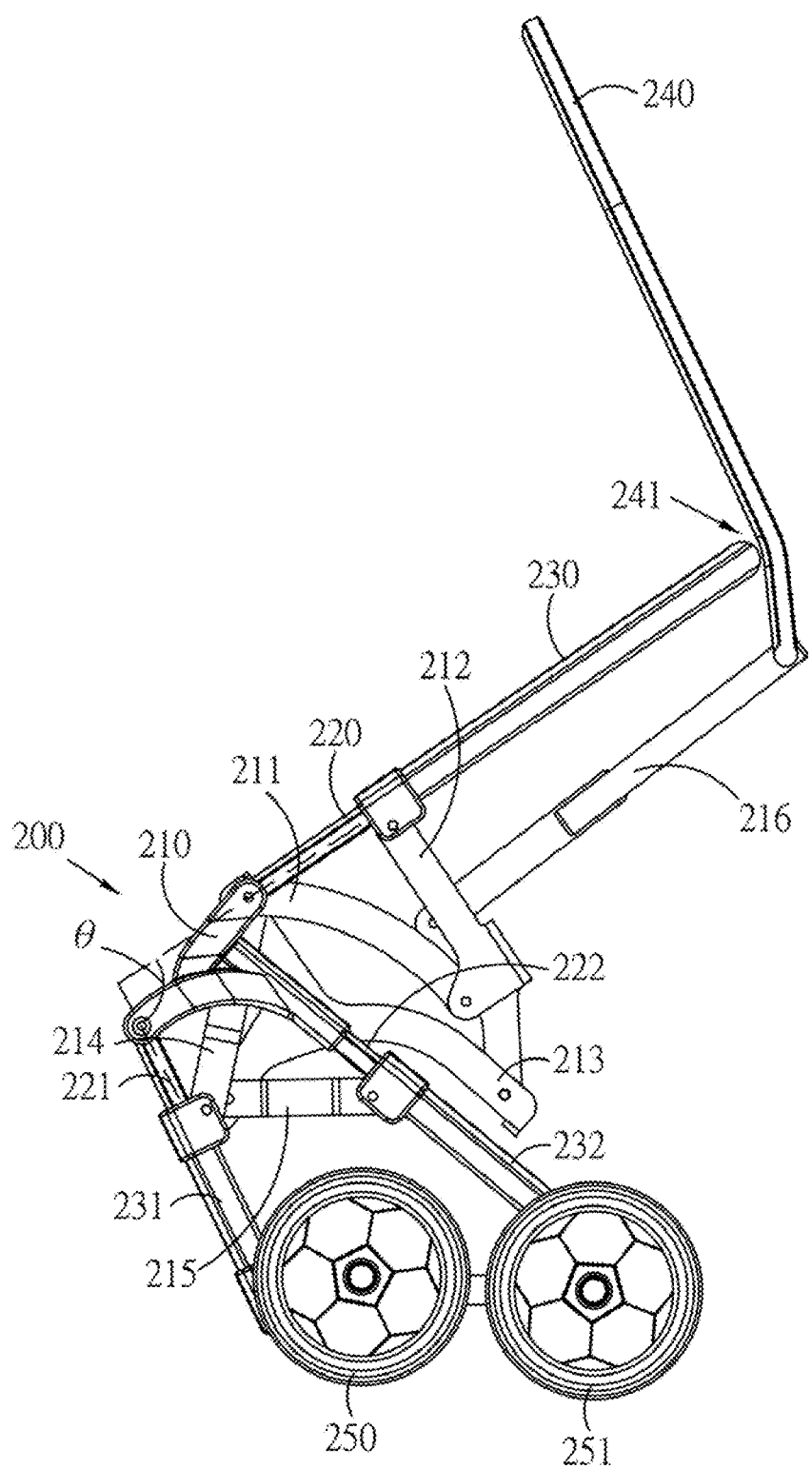
FIG. 11 is a side view of a cart with a telescopic structure according to another embodiment of this disclosure, wherein the cart is in a semi-folded state.
Figure 12:
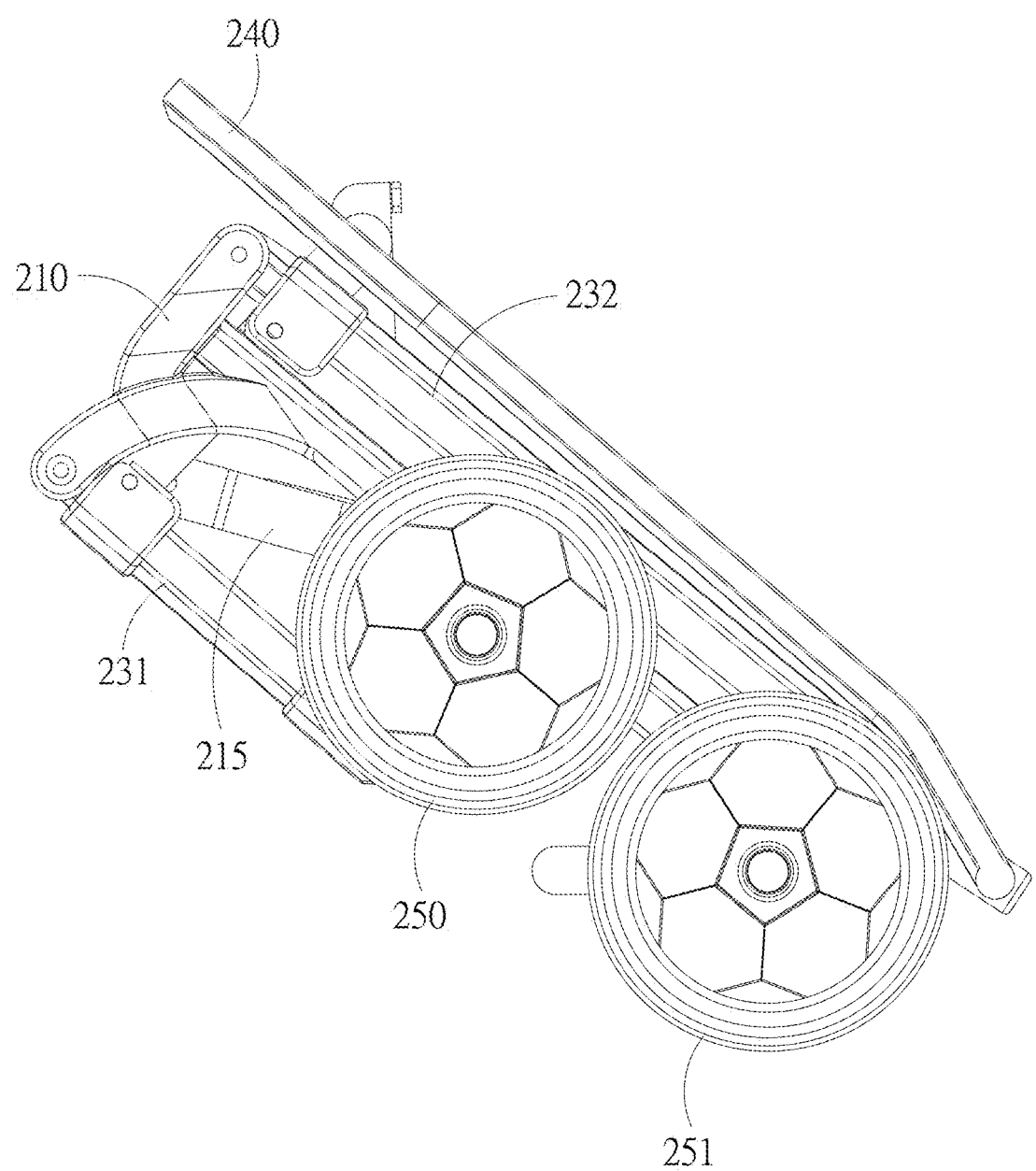
FIG. 12 is a side view of a cart with a telescopic structure according to another embodiment of this disclosure, wherein the cart is in a fully folded state.

FIG. 10 is a side view of a cart 20 with a telescopic structure according to another embodiment of this disclosure, wherein the cart 20 is in a starting folded state, FIG. 11 is a side view of the cart 20 with a telescopic structure according to another embodiment of this disclosure, wherein the cart 20 is in a semi-folded state, and FIG. 12 is a side view of the cart 20 with a telescopic structure according to another embodiment of this disclosure, wherein the cart 20 is in a fully folded state. That is, FIGS. 10 to 12 show the sequential views of the cart 20 during the folding operation. Referring to FIGS. 10 to 12, when the first telescopic tube 220 rotates toward the first direction D1 with respect to the mechanical main body 210, the first linking rod 212 and the auxiliary linking rod 211 can drive the multi-joint linking rod 213 to rotate toward the first direction D1, thereby further moving the second linking rod 214 and the third linking rod 215 for retracting the first telescopic rod 230, the second telescopic rod 231, and the third telescopic rod 232 and decreasing the angle θ between the first telescopic tube 220 and the second telescopic tube 221. That is, the first telescopic tube 220 and the second telescopic tube 221 are folded toward the third telescopic tube 222. On the contrary, when the first telescopic tube 220 is rotated toward the second direction D2 with respect to the mechanical main body 210, the auxiliary linking rod 211 and the first linking rod 212 can drive the multi-joint linking rod 213 to rotate toward the second direction D2, thereby further moving the second linking rod 214 and the third linking rod 215 for releasing the first telescopic rod 230, the second telescopic rod 231, and the third telescopic rod 232, and increasing the angle θ between the first telescopic tube 220 and the second telescopic tube 221. That is, the first telescopic tube 220 and the second telescopic tube 221 are extended toward the direction away from the third telescopic tube 222. In addition, one side of the first linking rod 212 is connected to the auxiliary linking rod 211 and the first telescopic rod 230, and the opposite side of the first linking rod 212 is connected to the multi joint linking rod 213 and the extension linking rod 216. Accordingly, the first linking rod 212 can simultaneously connect to the actions of multiple components, and the configuration of the auxiliary linking rod 211 can assist to guide the action of the linkage mechanism 200 and enhance the structural stability.

In this embodiment, when the first telescopic tube 220 rotates toward the first direction D1 with respect to the mechanical main body 210, the first telescopic rod 230 is folded toward the first telescopic tube 220, so that the curved portion 241 drives the handle 240 to rotate toward the second direction D2. On the contrary, when the first telescopic tube 220 is rotated toward the second direction D2 with respect to the mechanical main body 210, the first telescopic rod 230 protrudes outwardly with respect to the first telescopic tube 220, and the curved portion 241 drives the handle 240 to rotate toward the first direction D1. That is, the user can also use the handle 240 as a lever to easily extend and fold the cart 20 by the operation of the telescopic structure.

Figure 13:
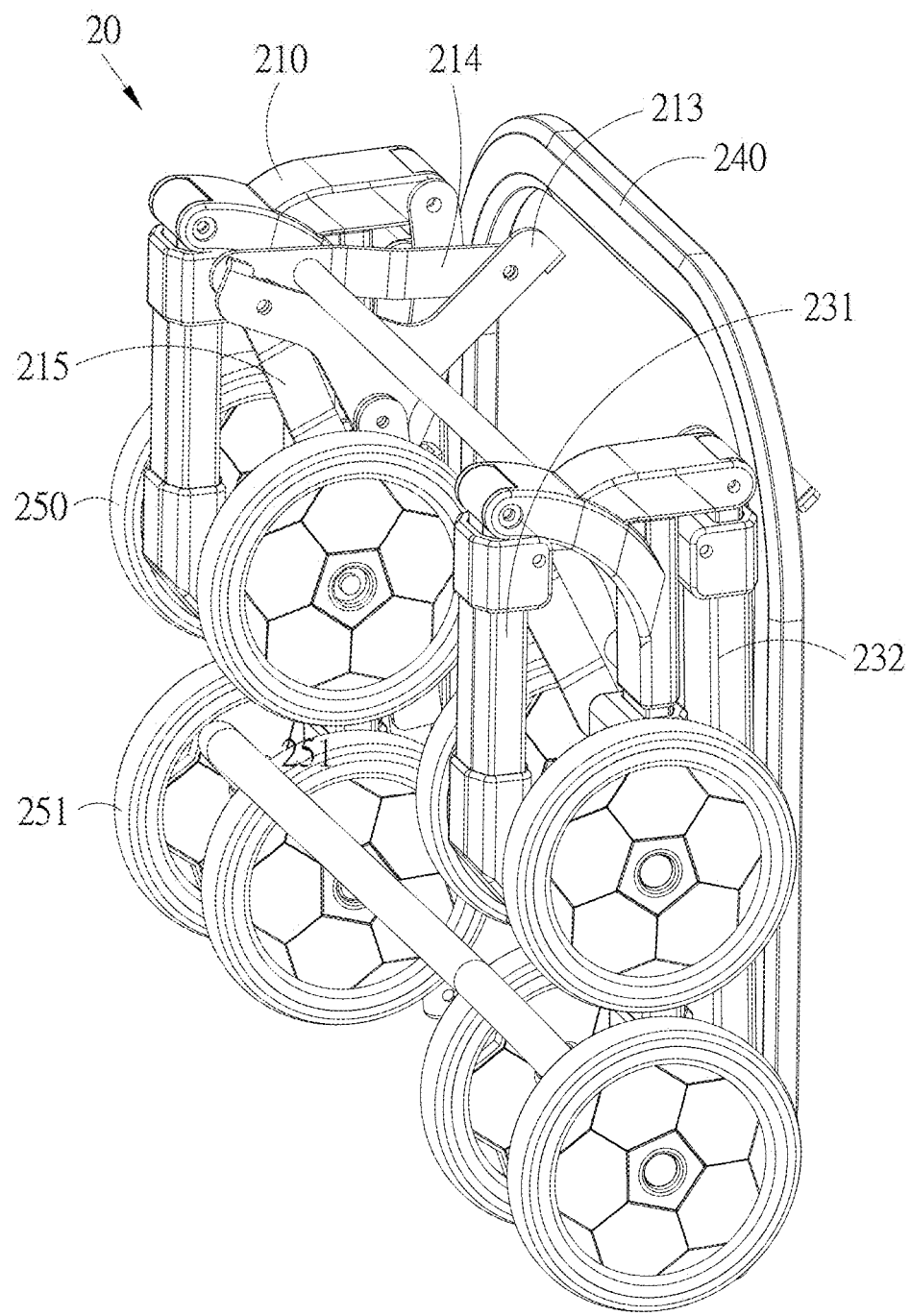
FIG. 13 is a schematic perspective diagram of a cart with a telescopic structure according to another embodiment of this disclosure, wherein the cart is in a fully folded state.

FIG. 13 is a schematic perspective diagram of the cart 20 with a telescopic structure according to another embodiment of this disclosure, wherein the cart 20 is in a fully folded state. As mentioned above, when the cart 20 is fully folded, the components thereof are folded toward the center (the mechanical main body 210) for reducing the volume thereof. On the contrary, when the user needs to use the cart 20, the user can easily extend the cart 20 by operating the handle 240, thereby obtaining the cart 20 with a stable structure and the accommodation portion 260 for receiving objects.

In summary, the cart 10 or 20 with a telescopic structure of this disclosure can automatically extend or fold the structure of the cart 10 or 20 through the linkage mechanism 151 or 200, thereby achieving the effects of easy operation, time saving and labor saving.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A cart with a telescopic structure, characterized in that the cart comprises:
   a telescopic rod;
   a telescopic tube, wherein at least one of the telescopic rod and the telescopic tube has a hollow structure configured to provide an accommodation space for collapsing the telescopic rod and the telescopic tube;
   a linkage mechanism connected to one end of the telescopic tube away from the hollow structure, and connected to one end of the telescopic rod close to the hollow structure; and
   a frame connected to the linkage mechanism;
   wherein, when the frame is rotated with respect to the linkage mechanism and folded, the telescopic tube is also rotated with respect to the linkage mechanism, and one of the telescopic tube and the telescopic rod is retracted into the other one thereof by the linkage mechanism.

2. The cart of claim 1, characterized in that: the linkage mechanism comprises:
   a gear; and
   at least two rotation members capable of rotating with respect to each other, wherein each of the rotation members comprises a hole, the hole is configured with a rack, the racks are disposed corresponding to each other, the gear is disposed through the holes and engaged with the racks, and when the at least two rotation members are relatively rotated, the gear is driven to rotate; and
   one of the rotation members comprises a first extension portion connecting to the end of the telescopic tube away from the hollow structure.

3. The cart of claim 2, characterized in that: the telescopic tube comprises a sliding wheel disposed at one end of the telescopic tube close to the hollow structure and a sliding rail disposed in the hollow structure, and the linkage mechanism comprises:
   a first driving member connected to one side of the gear, wherein the first driving member comprises a first transmission member, which is retractable, and one end of the first transmission member is connected to the telescopic rod through the sliding wheel; and
   a second driving member connected to another side of the gear, wherein the second driving member comprises a second transmission member, which is retractable, and the second transmission member is connected to the telescopic rod;
   wherein, when the telescopic tube rotates toward a first direction with respect to the linkage mechanism to drive the at least two rotation members to relatively rotate, thereby further driving the gear to rotate the first driving member and the second driving member so as to release the first transmission member and pull the second transmission member back, so that the telescopic rod moves along the sliding rail and is retracted into the telescopic tube.

4. The cart of claim 3, characterized in that: when the telescopic tube is rotated toward a second direction with respect to the linkage mechanism to drive the at least two rotation members to relatively rotate, thereby further driving the gear to rotate the first driving member and the second driving member so as to pull the first transmission member back and release the second transmission member, so that the telescopic rod moves along the sliding rail and protrudes from the telescopic tube, and the first direction is different from the second direction.

5. The cart of claim 4, characterized in that: the other one of the rotation members comprises a second extension portion, and the first extension portion and the second extension portion extend toward different directions.

6. The cart of claim 5, characterized in that: the frame comprises a front frame connecting to a front wheel and a rear frame connecting to a rear wheel;
   wherein, the front frame connects to the second extension portion, and the rear frame connects to the linkage mechanism, so that the front frame and the telescopic tube can be extended or folded with respect to the rear frame through the linkage mechanism.

7. The cart of claim 6, characterized in that: the linkage mechanism further comprises a fixing member, wherein:
   when an angle between the front frame and the telescopic tube increases, the telescopic rod moves and protrudes from the telescopic tube based on an action of the linkage mechanism, and the fixing member fixes the action of the linkage mechanism; and
   when the angle between the front frame and the telescopic tube decreases, the telescopic rod moves and retracts into the telescopic tube based on the action of the linkage mechanism, and the fixing member fixes the action of the linkage mechanism.

8. The cart of claim 1, characterized in that: the linkage mechanism is a linking rod assembly.

9. The cart of claim 8, characterized in that: the telescopic tube comprises a first telescopic tube, a second telescopic tube and a third telescopic tube, the telescopic rod comprises a first telescopic rod, a second telescopic rod and a third telescopic rod, and the linking rod assembly further comprises:
- a mechanical main body connecting to one ends of the first telescopic tube, the second telescopic tube and the third telescopic tube away from the hollow structure;
- an auxiliary linking rod connecting to the mechanical main body;
- a first linking rod connecting to one ends of the auxiliary linking rod and the first telescopic rod close to the hollow structure;
- a multi-joint linking rod connecting to the first linking rod;
- a second linking rod connecting to one ends of the multi-joint linking rod and the second telescopic rod close to the hollow structure; and
- a third linking rod connecting to one ends of the multi-joint linking rod and the third telescopic rod close to the hollow structure;
- wherein, when the first telescopic tube rotates toward a first direction with respect to the mechanical main body, the first linking rod is driven through the auxiliary linking rod so as to rotate the multi-joint linking rod and further to move the second linking rod and the third linking rod for retracting the first telescopic rod, the second telescopic rod and the third telescopic rod and to decrease an angle between the first telescopic tube and the second telescopic tube.

10. The cart of claim 9, characterized in that: when the first telescopic tube is rotated toward a second direction with respect to the mechanical main body, the first linking rod is driven through the auxiliary linking rod so as to rotate the multi-joint linking rod and further to move the second linking rod and the third linking rod for releasing the first telescopic rod, the second telescopic rod and the third telescopic rod and to increase the angle between the first telescopic tube and the second telescopic tube.

11. The cart of claim 10, characterized in that: the linkage mechanism further comprises an extension linking rod, one end of the extension linking rod connects to the first linking rod, the other end of the extension linking rod connects to a handle, and the handle comprises a curved portion connecting to one end of the first telescopic rod away from the hollow structure,
wherein:
- when the first telescopic tube is rotated toward a first direction with respect to the mechanical main body, the handle is rotated toward the first telescopic rod so as to retract the first telescopic rod through the curved portion; and
- when the first telescopic tube is rotated toward a second direction with respect to the mechanical main body, the first telescopic rod protrudes outwardly with respect to the first telescopic tube, and the handle is rotated to move away from the first telescopic rod through the curved portion.

12. The cart of claim 11, characterized in that: the second telescopic rod and the third telescopic rod connect to the front wheel and the rear wheel, respectively, and the linkage mechanism further comprises a fixing member, wherein:
- when an angle between the first telescopic tube and the second telescopic tube increases, the first telescopic rod, the second telescopic rod and the third telescopic rod are released based on an action of the linkage mechanism, and the fixing member fixes the action of the linkage mechanism; and
- when the angle between the first telescopic tube and the second telescopic tube decreases, the first telescopic rod, the second telescopic rod and the third telescopic rod are retracted based on the action of the linkage mechanism, and the fixing member fixes the action of the linkage mechanism.

\* \* \* \* \*